US012766708B2

(12) United States Patent
Mao et al.

(10) Patent No.: US 12,766,708 B2
(45) Date of Patent: Oct. 20, 2026

(54) METHOD AND APPARATUS FOR MANAGING ROBOT PATH

(71) Applicant: ABB SCHWEIZ AG, Baden (CH)

(72) Inventors: Yichao Mao, Shanghai (CN); Jiafan Zhang, Shanghai (CN)

(73) Assignee: ABB Schweiz AG, Baden (CH)

( * ) Notice: Subject to any disclaimer, the term of this patent is extended or adjusted under 35 U.S.C. 154(b) by 272 days.

(21) Appl. No.: 18/043,483

(22) PCT Filed: Sep. 17, 2020

(86) PCT No.: PCT/CN2020/115815
§ 371 (c)(1),
(2) Date: Feb. 28, 2023

(87) PCT Pub. No.: WO2022/056765
PCT Pub. Date: Mar. 24, 2022

(65) Prior Publication Data
US 2023/0311310 A1 Oct. 5, 2023

(51) Int. Cl.
*B25J 9/16* (2006.01)

(52) U.S. Cl.
CPC ............. *B25J 9/163* (2013.01); *B25J 9/1605* (2013.01); *B25J 9/1653* (2013.01); *B25J 9/1692* (2013.01);
(Continued)

(58) Field of Classification Search
CPC ........ B25J 9/163; B25J 9/1605; B25J 9/1692; B25J 9/1664; B25J 9/1653; B25J 9/10;
(Continued)

(56) References Cited

U.S. PATENT DOCUMENTS 4,831,549 A 5/1989 Red
5,180,956 A * 1/1993 Oaki ........................ B25J 9/163 318/568.22
(Continued)

FOREIGN PATENT DOCUMENTS

CN 102806560 A 12/2012
CN 105980940 B 9/2016
(Continued)

OTHER PUBLICATIONS

Matlab et al.—NPL, “Least-Squares Fitting”, <https://web.archive.org/web/20180731164413/http://www.mathworks.com/help/curvefit/least-squares-fitting.html>, NPL Date Jul. 31, 2018 (Year: 2018).*
(Continued)

*Primary Examiner* — Jason Holloway
*Assistant Examiner* — Benjamin J Brosh
(74) *Attorney, Agent, or Firm* — Whitmyer IP Group LLC

(57) ABSTRACT

Methods, apparatuses, systems, and computer readable media for managing a path of a robot system. The systems include comprises an arm which has a joint for rotating the arm. In the methods, a real path of a tip of the robot system is obtained during directing a movement of the tip to follow an ideal path. A path deviation is identified between the real path and the ideal path. A transmission error of the joint is determined based on the path deviation and kinematic data associated with the movement and a plurality of rotations of the joint respectively at a plurality of time points during the movement.

18 Claims, 5 Drawing Sheets

(52) U.S. Cl.
CPC .............. *G05B 2219/36415* (2013.01); *G05B 2219/37506* (2013.01); *G05B 2219/39024* (2013.01); *G05B 2219/39191* (2013.01)

(58) Field of Classification Search
CPC .................. B25J 9/1628; B25J 9/1641; G05B 2219/36415; G05B 2219/39024; G05B 2219/39191; G05B 2219/37506; G05B 2219/40456; G05B 2219/40457; G05B 2219/41119; G05B 2219/41365; G05B 2219/39044; G05B 2219/40526; G05B 2219/49181
See application file for complete search history.

(56) References Cited

U.S. PATENT DOCUMENTS

| | | | | |
|---|---|---|---|---|
| 5,305,241 A * | 4/1994 | Hayashi | G01D 5/2449 702/94 |
| 6,269,284 B1 * | 7/2001 | Lau | G01B 21/042 700/56 |
| 6,535,794 B1 | 3/2003 | Raab | |
| 9,196,518 B1 | 11/2015 | Hofmeister | |
| 2004/0093119 A1 | 5/2004 | Gunnarsson et al. | |
| 2009/0074979 A1 | 3/2009 | Krogedal | |
| 2015/0045954 A1 * | 2/2015 | Negishi | B25J 9/1607 700/262 |
| 2016/0282855 A1 | 9/2016 | Zhang | |
| 2019/0176325 A1 * | 6/2019 | Liu | B25J 9/1653 |
| 2020/0282559 A1 | 9/2020 | He | |
| 2020/0324410 A1 * | 10/2020 | Bergantz | B25J 9/1664 |

FOREIGN PATENT DOCUMENTS

| | | | |
|---|---|---|---|
| CN | 105182906 B * | 9/2017 |
| CN | 107639635 A | 1/2018 |
| CN | 109933008 A * | 6/2019 |
| CN | 110370271 A | 10/2019 |
| CN | 111136652 A | 5/2020 |
| CN | 111530670 A | 8/2020 |
| DE | 102009014766 A1 | 9/2010 |
| JP | 4052490 B2 | 2/2008 |
| JP | 2011224662 A * | 11/2011 |
| JP | 2014136260 A | 7/2014 |
| WO | 2014139938 A1 | 9/2014 |

OTHER PUBLICATIONS

NPL, “A New Approach to Design Optimal Excitation Trajectories for Parameter Estimation of Robot Dynamics”, Du et al., Pub: Jul. 2014, <https://ieeexplore.ieee.org/document/6915172> (Year: 2014).*
NPL, “A Learning Controller for Robot Manipulators Using Fourier Series”, Tang et al., Pub: Feb. 2000, <https://ieeexplore.ieee.org/document/833186> (Year: 2000).*
NPL, “Input Signal Analysis for an Adaptive Computed Torque Control Scheme Applied to a Three DOF Cylindrical Robot”, Karim et al., Pub: 1990, <https://ieeexplore.ieee.org/document/101931> (Year: 1990).*
CN 105182906 B, Based on High-Order S-shaped Movement Track of the Position and Speed Control Method, Liu et al., Filed: Sep. 24, 2015 Pub: Sep. 1, 2017, English Translation (Year: 2017).*
CN 109933008 A, Double Interpolation Method and Device for Non-real Time System and a Robot Controller, Gao et al., Filed: Mar. 28, 2019 Pub: Jun. 25, 2019, English Translation (Year: 2019).*
JP 2011-224662 A, Correction Parameter Identification Device of Robot Control Device, Nagai et al., Filed: Apr. 15, 2010 Pub: Nov. 10, 2011, English Translation (Year: 2011).*
Vaklininejad et al.—NPL, “Identification and Compensation of Periodic Gear Transmission Errors in Robot Manipulators”, IEEE, Published Feb. 1, 2019, <https://ieeexplore.ieee.org/document/8754980?source=IQplus>, (Year: 2019).*
Matlab et al.—NPL, “Least-Squares Fitting”, <https://web.archive.org/web/20180731164413/http://www.mathworks.com/help/ curve/least-squares-fitting.html>, NPL Date Jul. 31, 2018, (Year: 2018).*
Vakilinejad et al.—NPL, “Identification and Compensation of Periodic Gear Transmission Errors in Robot Manipulators”, IEEE, Published Feb. 1, 2019, <https://ieeexplore.ieee.org/document/8754980?source=IQplus> (Year: 2019).*
Matlab et al.—NPL, “Least-Squares Fitting”, <https://web.archive.org/web/20180731164413/http://www.mathworks.com/help/curve/least-squares-fitting.html>, NPL Dated Jul. 31, 2018 (Year: 2018).*
Vakilinejad et al., “Identification and Compensation of Periodic Gear Transmission Errors in Robot Manipulators”, 2019, IEEE, p. 126-132; 7 pages.

* cited by examiner

METHOD AND APPARATUS FOR MANAGING ROBOT PATH

CROSS-REFERENCE TO RELATED APPLICATIONS

This is a national stage application claiming priority to International patent application Serial No. PCT/CN2020/115815, filed on Sep. 17, 2020, which is herein incorporated by reference in its entirety.

FIELD

Example embodiments of the present disclosure generally relate to a robot system, and more specifically, to methods, apparatuses, systems and computer readable media for managing a robot path of the robot system.

BACKGROUND

With the development of computer and automatic control, robot systems have been widely used to process various types of objects in the manufacturing industry. For example, a tool may be equipped at a tip of the robot system for cutting, grabbing and other operations. Typically, a robot system may have a plurality of mechanical arms, each of which may be rotated by a corresponding joint at an end of the arm. The joint is driven by a gearbox, while rotations of the joint are not always accurate due to gearbox mechanism errors and other errors. Sometimes a transmission error may be caused during a movement of the joint. Usually, the robot system may have multiple arms and transmission errors caused by multiple joints of the multiple arms may be accumulated and thus result in a path deviation at the tip of the robot system.

There have been proposed several solutions for calibrating the above errors. However, when faced with increasing demands on microelectronic device production, more accurate path performance is required in the robot system and existing calibration solutions cannot provide enough accuracy in the calibration. Therefore, it is desired to propose more accurate management for the robot path.

SUMMARY

Example embodiments of the present disclosure provide solutions for controlling a robot path of a robot system.

In a first aspect, example embodiments of the present disclosure provide a method for managing a robot path of a robot system, here the robot system comprises at least one arm, and an arm in the at least one arms has a joint for rotating the arm. The method comprises: obtaining a real path of a tip of the robot system during directing a movement of the tip to follow an ideal path; identifying a path deviation between the real path and the ideal path; and determining a transmission error of the joint based on the path deviation and kinematic data associated with the movement and a plurality of rotations of the joint respectively at a plurality of time points during the movement. Here, a tip of the robot system may be driven to follow the ideal path. Due to the transmission error of the joint(s), the tip may follow a real path which is different from the ideal path. In order to determine the transmission error, a path deviation may be determined between the real path and the ideal path. Further, kinematic data of the robot system may be collected. With these embodiments, the path deviation and the kinematic data are easily to be collected, and then the transmission error of the joint may be effectively. Once the transmission error is determined, it may be used for further correcting a to-be-run path in the robot system, such that the robot system may operate with an increased accuracy.

In some embodiments, determining the transmission error comprises: representing the transmission error by a group of sinusoid functions, a sinusoid function in the group of sinusoid functions being associated with the plurality of rotations of the joint; aligning the transmission error with the path deviation according to the plurality of time points; and determining the group of sinusoid functions at the plurality of time points based on the aligned path deviation and the kinematic data. With these embodiments, the transmission error may be easily represented by the group of sinusoid functions comprising multiple unknown parameters. Further, the multiple unknown parameters may be determined based on solving a formula including the path deviation and the kinematic data at a plurality of time points during the movement.

In some embodiments, representing the transmission error comprises: with regard to the sinusoid function in the group of sinusoid functions, defining the sinusoid function by an amplitude and a phase shift. As the transmission error is caused by a rotation of the joint, the transmission error may be effectively defined with sinusoid parameters such as the amplitude and the phase shift according to existing solutions. With these embodiments, the amplitude and the phase shift may act as unknown parameters and then be calculated by solving formulas including the path deviation and the kinematic data.

In some embodiments, determining the group of sinusoid functions comprises: with respect to a time point in the plurality of time points, generating a formula based on a value in the path deviation and data in the kinematic data; and solving the amplitude and the phase shift based on formulas for the plurality of time points. Values at each time point may be used to build an individual formula including the unknown amplitude and the phase shift. Further, formulas for the plurality of time points may be combined for providing more grounds for determining the transmission error. Therefore, multiple candidates may be determined for the amplitude and the phase shift.

In some embodiments, solving the amplitude and the phase shift comprises: solving the amplitude and the phase shift under a constraint that a sum of the differences being minimized. With this constraint, a group of optimized amplitudes and phase shifts may be selected from the multiple candidates for accurately representing the transmission error.

In some embodiments, the method further comprises: with respect to a time point in the plurality of time points, obtaining the kinematic data based on an offset in the real path caused by a rotation of the joint at the time point. With these embodiments, the kinematic data may be collected at each time point during the movement, such that the kinematic data may be effectively aligned to the path deviation.

In some embodiments, the ideal path relates to at least one direction in a coordinate of the robot system. With these embodiments, the ideal path may be defined in a simple manner and thus processing cost for determining the transmission error may be reduced.

In some embodiments, a frequency related to the plurality of time points is higher than twice of a product of a frequency coefficient of any sinusoid function and an angle speed of the joint. With these embodiments, more information may be collected from the movement, such that the transmission error may be determined in an accurate manner.

In some embodiments, the method further comprises: correcting, by the transmission error, a path that is to be followed by the tip of the robot system; and directing a movement of the tip to follow the corrected path. With these embodiments, the determined transmission error may be used to control further operations of the robot system by correcting the to-be-run path. With the corrected path, the tip of the robot system may follow the ideal path in a more accurate way, so as to increase a whole performance of the robot system.

In some embodiments, correcting the path comprises: with respect to a time point in the path, determining a path offset associated with a rotation of the joint at the time point; and updating, by the path offset, a point in the path at the time point. As values in the transmission error vary at various time points, each point in the ideal may be corrected based on a value corresponding to the point in the transmission error. Therefore, points in the path may be corrected one by one in a more reliable way.

In some embodiments, the method further comprises: obtaining a further real path of the tip during directing a further movement of the tip to follow a further ideal path; identifying a further path deviation between the further real path and the further ideal path; determining a further transmission error of the joint based on the further path deviation and further kinematic data associated with the further movement; and correcting, by the transmission error and the further transmission error, a path that is to be followed by the tip of the robot system. With these embodiments, the method for determining the transmission error may be implemented multiple times so as to provide a more accurate way for correcting the path.

In a second aspect, example embodiments of the present disclosure provide an apparatus for managing a robot path of robot system, the robot system comprises at least one arm, and an arm in the at least one arms has a joint for rotating the arm. The apparatus comprises: an obtaining unit, being configured for obtaining a real path of a tip of the robot system during directing a movement of the tip to follow an ideal path; an identifying unit, being configured for identifying a path deviation between the real path and the ideal path; and a determining unit, being configured for determining a transmission error of the joint based on the path deviation and kinematic data associated with the movement and a plurality of rotations of the joint respectively at a plurality of time points during the movement.

In some embodiments, the determining unit comprises: a representing unit, being configured for representing the transmission error by a group of sinusoid functions, a sinusoid function in the group of sinusoid functions being associated with the plurality of rotations of the joint; an aligning unit, being configured for aligning the transmission error with the path deviation according to the plurality of time points; and a function determining unit, being configured for determining the group of sinusoid functions at the plurality of time points based on the aligned path deviation and the kinematic data.

In some embodiments, the representing unit comprises: a defining unit, being configured for, with regard to the sinusoid function in the group of sinusoid functions, defining the sinusoid function by an amplitude and a phase shift.

In some embodiments, the function determining comprises: a generating unit, being configured for, with respect to a time point in the plurality of time points, generating a formula based on a value in the path deviation and data in the kinematic data; and a solving unit, being configured for solving the amplitude and the phase shift based on formulas for the plurality of time points.

In some embodiments, the solving unit comprises: a parameter solving unit, being configured for solving the amplitude and the phase shift under a constraint that a sum of the differences being minimized.

In some embodiments, the apparatus further comprises: a kinematic data obtaining unit, being configured for with respect to a time point in the plurality of time points, obtaining the kinematic data based on an offset in the real path caused by a rotation of the joint at the time point.

In some embodiments, the ideal path relates to at least one direction in a coordinate of the robot system, and a frequency related to the plurality of time points is higher than twice of a product of a frequency coefficient of any sinusoid function and an angular speed of the joint.

In some embodiments, the apparatus further comprises: a correcting unit, being configured for correcting, by the transmission error, a path that is to be followed by the tip of the robot system; and a directing unit, being configured for directing a movement of the tip to follow the corrected path.

In some embodiments, the correcting unit comprises: an offset determining unit, being configured for, with respect to a time point in the path, determining a path offset associated with a rotation of the joint at the time point; and an updating unit, being configured for updating, by the path offset, a point in the path at the time point.

In some embodiments, the obtaining unit being further configured for obtaining a further real path of the tip during directing a further movement of the tip to follow a further ideal path; the identifying unit being further configured for identifying a further path deviation between the further real path and the further ideal path; the determining unit being further configured for determining a further transmission error of the joint based on the further path deviation and further kinematic data associated with the further movement; and the correcting unit being further configured for correcting, by the transmission error and the further transmission error, a path that is to be followed by the tip of the robot system.

In a third aspect, example embodiments of the present disclosure provide a system for managing a robot path. The system comprises: a computer processor coupled to a computer-readable memory unit, the memory unit comprising instructions that when executed by the computer processor implements the method for managing a robot path.

In a fourth aspect, example embodiments of the present disclosure provide a computer readable medium having instructions stored thereon, the instructions, when executed on at least one processor, cause the at least one processor to perform the method for managing a robot path.

DESCRIPTION OF DRAWINGS

Throughout the drawings, the same or similar reference symbols are used to indicate the same or similar elements.

DETAILED DESCRIPTION OF EMBODIMENTS

Figure 1:
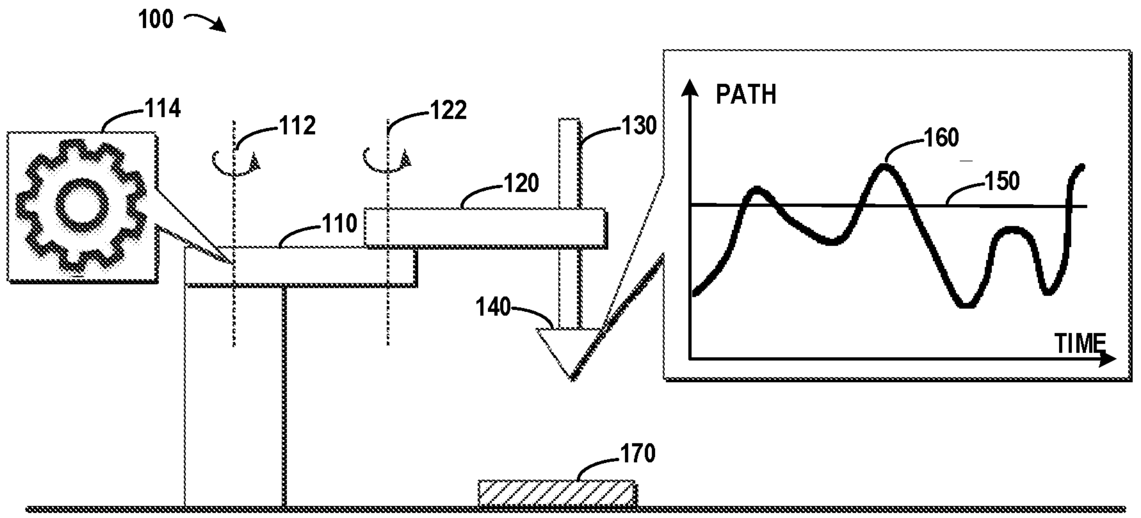
FIG. 1 illustrates a schematic diagram for a robot system in which embodiments of the present disclosure may be implemented.

Principles of the present disclosure will now be described with reference to several example embodiments shown in the drawings. Though example embodiments of the present disclosure are illustrated in the drawings, it is to be understood that the embodiments are described only to facilitate those skilled in the art in better understanding and thereby achieving the present disclosure, rather than to limit the scope of the disclosure in any manner.

For the sake of description, reference will be made to FIG. 1 to provide a general description of environment of the present disclosure. FIG. 1 illustrates a schematic diagram for a robot system 100 in which embodiments of the present disclosure may be implemented. In FIG. 1, the robot system 100 may comprise at least one arms 110, 120, . . . , and 130, where the arm 110 is connected to a base of the robot system 100 via a joint 114, and the arm 120 is connected to the arm 130 via a joint. As shown, the arm 110 may rotate around an axis 112 of the joint 114, and the arm 120 may rotate around an axis 122 of a joint (not illustrated). A tip of the end arm 130 may be equipped with a tool 140 for processing an object 170 such as a raw material that is to be shaped by the robot system 110. Here, the tool may include, for example, a cutting tool for shaping the object 170 into a desired shape. As used herein, the term "arm" may be used interchangeably with the term "link."

During operations of the robot system 100, an ideal path 150 may be inputted into the robot system 100 for driving the tip along a straight line. However, due to errors in the robot system 100, the tip may actually follow a real path 160 in a curve form. At this point, the object 170 cannot be shaped according to the desired way. There have been proposed solutions for managing a robot path of the robot system. In some solutions, camera devices or other calibrating tools may be used to calibrate the robot system 100 and then remove the deviation between the ideal path 160 and the real path 150. However, the accuracy of the calibrated robot system still cannot reach a desired level.

In order to at least partially solve the above and other potential problems, a new method for managing a robot path is provided according to embodiments of the present disclosure. In general, according to embodiments of the present disclosure, a path deviation between the ideal path 150 and the real path 160 may be determined. A kinematic data related to rotations of the joint 114 and a movement of the tip may be collected for determining the transmission error of the joint. The transmission error depends on transmission torque, speed and other factors as gear(s) in the gearbox reach various angles during rotations. As the arm is rotated by the joint, transmission errors of the joint may be greatly affected by the rotations, and thus the real path 160 may show a periodical pattern related to rotations of the joint 114.

With the present embodiments, the transmission error of the joint 114 may be effectively determined based on the path deviation and the collected kinematic data. Once the transmission error is determined, it may be used for further correcting a robot path that is to be run by the robot system 100, therefore the tip of the robot system 100 may be controlled with an increased accurate level. Further, no calibrating tools are needed for determining the transmission error, such that time cost for equipping and removing the calibrating tools is eliminated.

Figure 2:
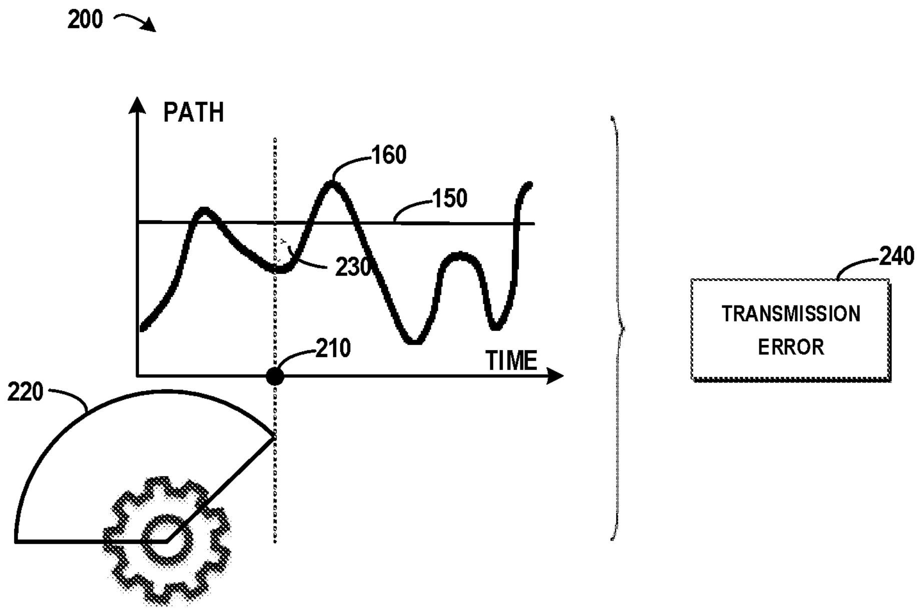
FIG. 2 illustrates a schematic diagram of a procedure for managing a robot path in accordance with embodiments of the present disclosure.

Reference will be made to FIG. 2 for a brief description of the present disclosure. FIG. 2 illustrates a schematic diagram 200 of a procedure for managing a robot path in accordance with embodiments of the present disclosure. In FIG. 2, an association between time points and a tip movement is illustrated, where a horizontal axis represents time points during the tip movement and the vertical axis represents a path of the tip. In order to calibrate the robot path, an ideal path 150 may be defined in advance, and the ideal path 150 may be a path for controlling a movement of the tip. During operations of the robot system 100, the tip may follow the real path 160 but not the ideal path 150 due to errors in the robot system 100. For a time point 210 when the joint 114 reaches an angle 220 during the tip movement, a deviation 230 may be determined between the real path 160 and the ideal path 150. Therefore, a path deviation may be obtained based on deviations at multiple time points during the tip movement. As both the path deviation and kinematic data may be easily measured, a transmission error 240 is determined for the joint 114 based on the path deviation and kinematic data effectively.

It is to be understood that the robot system 100 may have multiple joints, and each of these joints may have a corresponding transmission error. Although FIG. 2 shows only one example for determining the transmission error 240 related to the joint 114, transmission errors caused by other joints may be determined in a similar manner.

Figure 3:
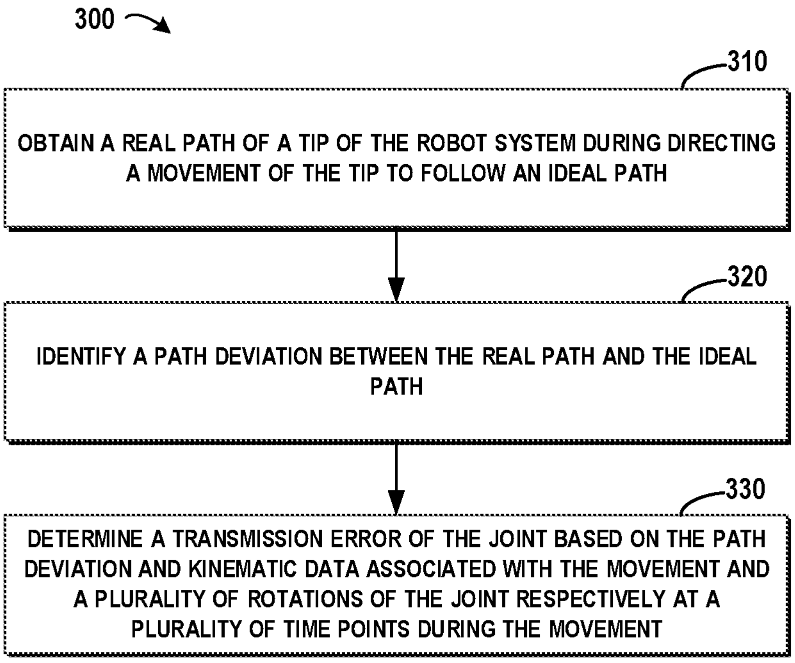
FIG. 3 illustrates a flowchart of a method for managing a robot path in accordance with embodiments of the present disclosure.
Figure 4:
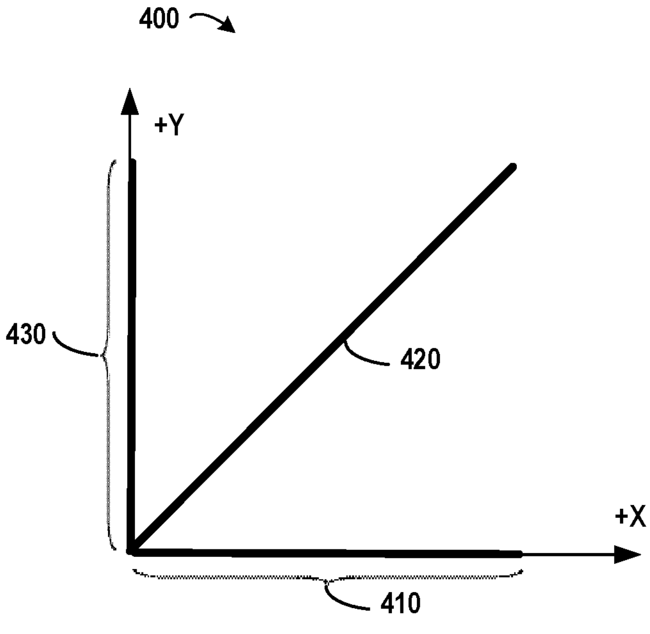
FIG. 4 illustrates a schematic diagram of ideal paths that may be used for determining a transmission error in accordance with embodiments of the present disclosure.

Hereinafter, reference will be made to FIG. 3 for more details about the embodiments. FIG. 3 illustrates a flowchart of a method 300 for managing a robot path in accordance with embodiments of the present disclosure. At block 310, a real path 160 of a tip of the robot system 100 may be obtained during directing a movement of the tip to follow an ideal path 150. Here, the tip of the robot system 100 may be driven to follow the ideal path 150 that is predefined by an administrator of the robot system 100. FIG. 4 illustrates a schematic diagram 400 of ideal paths that may be used for determining a transmission error in accordance with embodiments of the present disclosure.

Usually, in order to reduce computing workload for the calibration, the ideal path 150 may be defined as a straight line. A matrix $M_{measure}$ may be defined to represent a direction of the ideal path 150. As illustrated in FIG. 4, a line 410 (represented by $M_{measure}=[1\ 0\ 0]$) along the x axis may be defined as the ideal path 150, a line 430 along the y axis (represented by $M_{measure}=[0\ 1\ 0]$) may be defined as the ideal path 150, and a line 420 (represented by $$M_{measure} = \left[\frac{\sqrt{2}}{2}\ \ \frac{\sqrt{2}}{2}\ \ 0\right])$$

having an angle of 45° with the x axis may be defined as the ideal path 150. It is to be understood, FIG. 4 just provides multiple examples of the ideal path 150. In other embodiments, the ideal path 150 may be defined along the z axis or have a different direction defined by another vector. With these embodiments, the ideal path 150 may be defined in a simple manner and thus processing cost for determining the transmission error 240 may be reduced.

Due to the transmission error(s) of the joint(s), the real path 160 of the tip is different from the ideal path 150, and positions at various time points during the tip movement may be collected. For example, a sensor may be equipped at the tip for collecting the real positions at each time point during the tip movement. Based on a geometrical relationship, the real position at one time point may be determined based on the following Formula 1.

$$\vec{p}_{sensor} = M_{measure}\vec{p}_{robot} \qquad \text{Formula 1}$$

Where $\vec{p}_{sensor}$ represents the real position of the tip in the real path 160, $\vec{p}_{robot}$ represents the ideal position of the tip in the ideal path 150, and $M_{measure}$ represents a direction of the ideal path 150. It is to be understood that Formula 1 just shows the real position of the tip at one time point, and Formula 1 may be adapted to each of the time points during the tip movement. Specifically, if the path includes n time points, then there will be n formulas and each formula represents a relationship between the real and ideal positions at one time point. Here, the positions may be represented by x, y, z values in a three-dimension coordinate system.

At block 320, a path deviation is identified between the real path 160 and the ideal path 150. The path deviation may be determined at each of the time points, and thus the path deviation may include n deviations at the n time points, respectively. At this point, the path deviation may also be represented by a curve, and values in the path deviation are determined by differences between respective values in the real path 160 and the ideal path 150.

Figure 5:
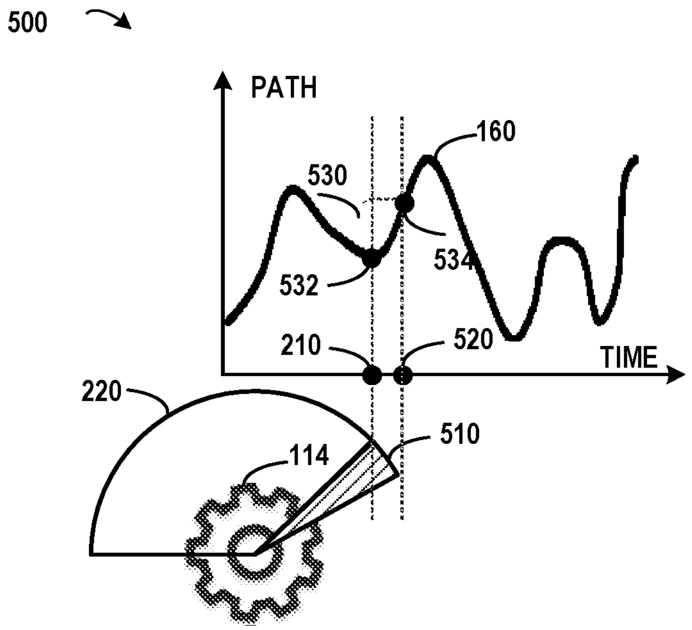
FIG. 5 illustrates a schematic diagram of an association between a path and a rotation of a joint in accordance with embodiments of the present disclosure.

At block 330, a transmission error 240 of the joint 114 is determined based on the path deviation and kinematic data associated with rotations of the joint 114 and the movement at a plurality of time points during the movement. During the tip movement, the kinematic data of the robot system 100 may be collected from a controller of the robot system 100 and the sensor. Hereinafter, reference will be made to FIG. 5 for further details. FIG. 5 illustrates a schematic diagram 500 of an association between a path and a rotation of a joint in accordance with embodiments of the present disclosure. During operations of the robot system 100, the tip may move along the real path 160 as the joint 114 rotates.

At the time point 210, the joint 114 may reach the angle 220 and the tip may reach the point 532 in the real path 160. At a next time point 520, the joint 114 may rotate an angle 510 to reach an angle of a sum of the angle 220 and the angle 510. Meanwhile, the tip may reach the point 534 in the real path 160.

In some embodiments, the transmission error 240 may be aligned with the path deviation based on FIG. 5. During the time difference between the time points 210 and 520, the rotation difference may include the angle 510 and the distance difference may include an offset 530. Here, the angle 510 may be collected directly from the controller of the robot system 100, and the offset 530 may be determined based on 3D positions of the tip at the time points 210 and 520. With these embodiments, the kinematic data may be collected at each time point during the tip movement, such that the kinematic data may be further used to determine the transmission error 240.

In some embodiments, a Jacobian matrix of the robot system 100 may be determined for a time point in the plurality of time points. Specifically, the Jacobian matrix may be determined based on a difference between a value in the ideal path 150 and data in the kinematic data according to Formula 2 as below.

$$J_{robot} = \frac{\Delta\vec{p}_{robot}}{d\vec{\theta}} \qquad \text{Formula 2}$$

Where $J_{robot}$ represents the Jacobian matrix for the robot system 100, $\Delta\vec{p}_{robot}$ represents an offset of the tip between two continuous time points in the ideal path 150, and $d\vec{\theta}$ represents an angle difference of the joint 114 between the two continuous time points. In other words, the Jacobian matrix defines a ratio between an offset covered by a rotation of the joint.

Hereinafter, reference will be made to Formulas 3 to 6 for providing details for a determination of the transmission error 240. For the purpose of description, $\Delta\vec{\theta}$ is for representing an angle error caused by the transmission error 240 of the joint 114. For example, the controller of the robot system wants to rotate the joint to the angle $\vec{\theta}$, due to the transmission error 240, the joint 114 actually reaches the angle $\vec{\theta}+\Delta\vec{\theta}$. Considering the angle error $\Delta\vec{\theta}$ is relatively small after the traditional calibration, the first order Taylor expansion of the position of the tip may be represented by:

$$\vec{p}_{robot}(\vec{\theta}+\Delta\vec{\theta}) = \vec{p}_{robot}(\vec{\theta}) + J_{robot}\Delta\vec{\theta} \qquad \text{Formula 3}$$

Where $\vec{\theta}$ represents a vector of the ideal joint angle, $\Delta\vec{\theta}$ represents the angle error caused by the transmission error, $\vec{p}_{robot}(\vec{\theta})$ represents a position of the tip when the joint reaches the joint angle $\vec{\theta}$, $\vec{p}_{robot}(\vec{\theta}+\Delta\vec{\theta})$ represents a position of the tip when the joint reaches the joint angle $\vec{\theta}+\Delta\vec{\theta}$, and $J_{robot}$ represents the Jacobian matrix for the robot system.

Based on the above Formulas 1 to 3, the real position of the tip may be determined based on the following Formula 4.

$$\begin{aligned}\vec{p}_{sensor} &= M_{measure}\vec{p}_{robot} \\ &= M_{measure}\left(\vec{p}_{robot}(\vec{\theta}) + J_{robot}\Delta\vec{\theta}\right) \\ &= M_{measure} * \vec{p}_{robot}(\vec{\theta}) + M_{measure} * J_{robot}\Delta\vec{\theta}\end{aligned} \qquad \text{Formula 4}$$

Where $\vec{p}_{sensor}$ represents the real position of the tip in the real path, $\vec{p}_{robot}$ robot represents the ideal position of the tip in the ideal path, $M_{measure}$ represents a direction of the ideal path, $J_{robot}$ represents the Jacobian matrix for the robot system, $\vec{\theta}$ represents a vector of the joint angle at a time point, and $\Delta\vec{\theta}$ represents an angle error caused by the transmission error.

In the above Formula 4, $M_{measure} * \vec{p}_{robot}(\vec{\theta})$ shows the ideal position of the tip and $\vec{p}_{sensor}$ shows the real position of the tip. If the robot system 100 is calibrated, then the deviation between the ideal position and the real position is caused by the transmission error 240 in the joint 114. In other words, $M_{measure} * J_{robot} \Delta\vec{\theta}$ in the above Formula 4 is caused by the transmission error 240.

It is to be understood that the above Formula 4 just shows relationships between various parameters at one time point during the tip movement. For the multiple time points during the tip movement, a specific formula may be determined for each of the time points based on Formula 4. Details for determining the transmission error will be presented hereinafter based on the above Formula 4.

Figure 6:
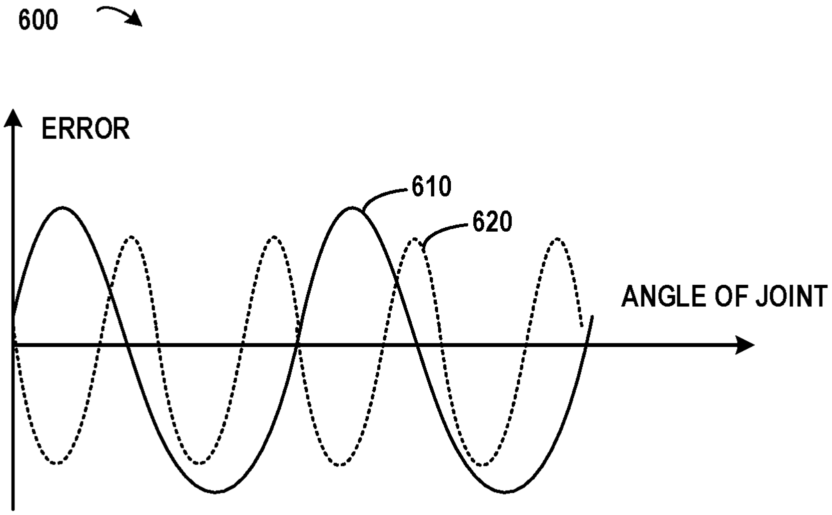
FIG. 6 illustrates a schematic diagram for representing a transmission error of an arm of a robot system by sinusoid functions in accordance with embodiments of the present disclosure.

As the transmission error 240 is caused by rotations of the joint 114, the transmission error 240 provides a periodical change. In some embodiments, the transmission error 240 may be represented by a group of sinusoid functions, and each sinusoid function in the group of sinusoid functions is associated with a plurality of rotations of the joint 114 at the plurality of time points. FIG. 6 illustrates a schematic diagram 600 for representing a transmission error of an arm in accordance with embodiments of the present disclosure. In FIG. 6, the horizontal axis represents angles of the joint 114 and the vertical axis represents components in the transmission error 240. Here, the transmission error 240 is represented by a sum of a sinusoid function 610 and a sinusoid function 620. In other embodiments, due to an accuracy requirement, the transmission error 240 may be represented by more or less sinusoid functions.

In some embodiments, with regard to a sinusoid function in the group of sinusoid functions, the sinusoid function may be defined by an amplitude and a phase shift. As shown, the two sinusoid functions 610 and 620 may have different amplitudes and different phase shifts. As the transmission error 240 is caused by rotations of the joint 114, the transmission error 240 may be effectively defined with sinusoid parameters such as the amplitude and the phase shift. With these embodiments, the amplitude and the phase shift may act as unknown parameters and then be calculated by solving a formula including the path deviation and the kinematic data.

It is to be understood that the above two sinusoid functions are just example components included in the transmission error 240. In other embodiments, the transmission error 240 may include more or less components. Supposing there are u joints in the robot system 100 and the transmission error for each joint is represented by v sinusoid functions, the $j^{t}$ sinusoid function for the $i^{th}$ joint may be represented by:

$$\Delta\vec{\theta}_i = \sum\nolimits_{j=1}^{v} A_{i,j}\sin(k_{i,j}\theta_i + \varphi_{i,j}) \qquad \text{Formula 5}$$

Where $\Delta\vec{\theta}_i$ represents the transmission error for the $i^{th}$ joint, v represents the number of the sinusoid functions, $k_{i,j}$ represents a frequency coefficient of the $i^{th}$ joint, $\theta_i$ represents an angle position of the $i^{th}$ joint, $A_{i,j}$ represents the amplitude of the $j^{th}$ sinusoid function of the $i^{th}$ joint, and $\varphi_{i,j}$ represents the phase shift of the $j^{th}$ sinusoid function of the $i^{th}$ joint ($1 \le i \le u$, and $1 \le j \le v$). In the above Formula 5, $A_{i,j}$ and $\varphi_{i,j}$ are unknown parameters and other parameters may be measured by the sensors or determined based on prior art solution.

In some embodiments, the frequency related to time points in the above real path 160 and the ideal path 150 may be determined based on a frequency coefficient of the sinusoid functions. For example, the frequency for collecting should be high enough to reflect the periodical changes of the transmission error 240. Accordingly, the frequency for collecting may be higher than twice of a product of a frequency coefficient of any sinusoid function and an angle speed of the joint. With these embodiments, more information may be collected from the tip movement, such that the transmission error 240 may be determined in an accurate manner. Otherwise, if the frequency for collecting is lower than the above value, changes in the tip movement cannot reflect the periodical changes of the transmission error 240 and thus the accuracy will be reduced in determining the transmission error 240.

Based on the above Formulas 4 and 5, the group of sinusoid functions may be determined based on the aligned path deviation and the kinematic data. With these embodiments, the transmission error 240 may be easily represented by a group of sinusoid functions including multiple unknown parameters. Further, the multiple unknown parameters may be determined by generating a formula based on values in the path deviation and the kinematic data at a plurality of time points during the tip movement. Especially, the amplitude and the phase shift may be solved based on formulas generated for the plurality of time points based on the following Formula 6.

$$\min_{A_{i,j},\varphi_{i,j}} \sum \left\| \vec{p}_{sensor}(t_k) - M_{measure}\vec{p}_{robot}(t_k) - M_{measure}J_{robot}\Delta\vec{\theta}_i(t_k) \right\|^2 \qquad \text{Formula 6}$$

Where $t_k$ represent the $k^{th}$ time point in the multiple time points in the paths, $\vec{p}_{sensor}(t_k)$ represents a real position of the tip at the time point $t_k$, $M_{measure}\vec{p}_{robot}(t_k)$ represents an ideal position of the tip at the time point $t_k$, $M_{measure}$ represents a direction of the ideal path, $J_{robot}$ represents a Jacobian matrix of the robot system, here all of the above parameters have known values. In Formula 6, the last item $\Delta\vec{\theta}_i(t_k)$ defined based on Formula 5 includes the unknown parameters $A_{i,j}$ and $\varphi_{i,j}$.

With these embodiments, values in the path deviation and the kinematic data may be extracted at each time point during the movement. Values at each time point may be used to build an individual formula for solving the unknown amplitude and the phase shift. Further, the unknown parameters $A_{i,j}$ and $\varphi_{i,j}$ may be solved from above Formula 6 so as to determine the transmission error 240.

In some embodiments, the amplitude $A_{i,j}$ and the phase shift $\varphi_{i,j}$ may be solved under a constraint that a sum of the differences being minimized. With this constraint, a group of optimized amplitudes and phase shifts may be selected from the multiple candidates, therefore the accurate level may be increased in determining the transmission error 240.

It is to be understood that the above paragraphs provide only one example for determining the transmission error 240 related to the joint 114 based on a combination of Formulas 5 and 6. Hereinafter, reference will be made to Formula 7 for determining transmission errors related to multiple joints. In some embodiments, transmission errors for multiple joints may be represented by the following Formula 7.

$$\Delta\vec{\theta}_i = \begin{bmatrix} \sum_{j=1}^{v} A_{1,j} \sin(k_{1,j}\theta_1 + \varphi_{1,j}) \\ \vdots \\ \sum_{j=1}^{v} A_{i,j} \sin(k_{i,j}\theta_i + \varphi_{i,j}) \end{bmatrix} \quad \text{Formula 7}$$

Where $\Delta\vec{\theta}_i$ represents the transmission errors for the u joints, the matrix on the right side comprises u lines (each line indicating a transmission error for one joint), and various parameters in Formula 7 have the same meaning as those in Formula 5.

In some embodiments, transmission errors for all the joints may be determined based on the above Formula 7 and Formula 6. Specifically, a matrix including the transmission errors for all the joints may be used to replace the parameter $\Delta\vec{\theta}_i(t_k)$ in Formula 6. For example, if the robot system 100 has 6 joints, then 6 transmission errors may be determined for the 6 joints, respectively. At this point, formulas for the plurality of joints may be combined for providing more grounds for determining the transmission errors and thus multiple candidates may be determined for the amplitudes and the phase shifts.

In some embodiments, transmission errors for a portion of joints may be determined based on the above Formula 7 and Formula 6. Usually, joints near the base of the robot system 100 play more influences on the accuracy of the tip movement, and thus transmission errors related to joints near the base should be determined first. For example, transmission errors for the joints 110 and 120 may be generated based on Formula 7. At this point, the matrix comprises 2 lines and then the amplitudes and the phase shifts for the two groups of sinusoid functions may be determined for each joint.

With these embodiments, the transmission error(s) for the joint(s) may be effectively determined based on the path deviation and the collected kinematic data of the robot system during the tip movement. Once the transmission error is determined, it may be used for further correcting path that is to be run by the robot system 100, and thus the robot system 100 may operate with an increased accuracy.

Figure 7:
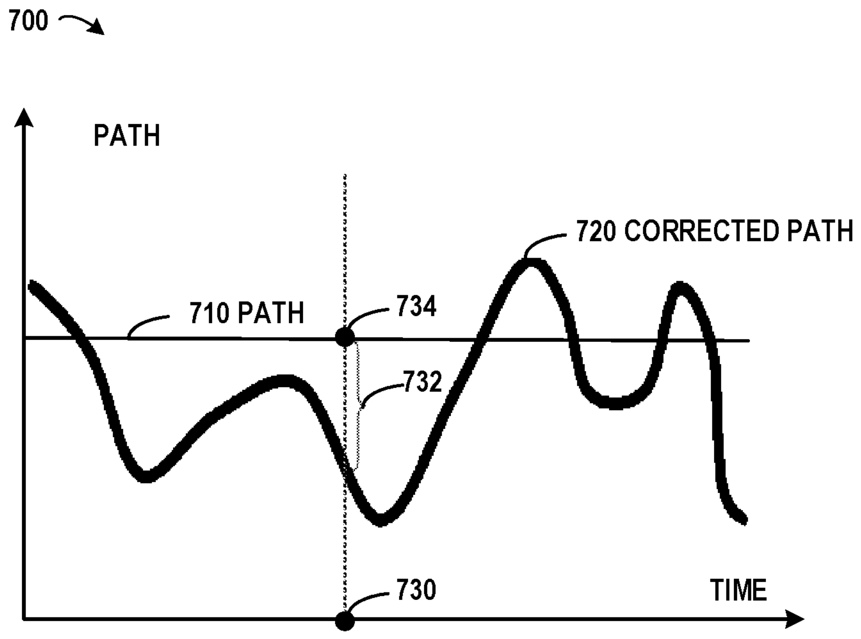
FIG. 7 illustrates a schematic diagram for correcting a robot path in accordance with embodiments of the present disclosure.

In some embodiments, the transmission error 240 may be used to correct a to-be-run path in the robot system 100. FIG. 7 illustrates a schematic diagram 700 for correcting a robot path in accordance with embodiments of the present disclosure. In FIG. 7, the tip of the robot system 100 is expected to follow a path 710 (such as a straight line), if the path 710 is directly inputted into the robot system 100 without a correction procedure, the tip will follow a curve but not a straight line. At this point, the transmission error 240 may be used for the correction procedure.

During the correction procedure, with respect to a time point 730 in the path 710, a path offset 732 associated with a rotation of the joint 114 at the time point 730 may be determined according to the transmission error 240. Then, a point 734 in the path 710 at the time point 730 may be updated by the path offset 732. The above updating operation may be implemented at each of the time points in the path 710, therefore the path 710 may be converted into the corrected path 720. As values in the transmission error 240 vary at various time points, with these embodiments, each point in the path 710 may be corrected based on a value corresponding to the point in the transmission error 240. Therefore, all the points in the path 710 may be corrected one by one in a more reliable way.

In some embodiments of the present disclosure, the path 710 may be the same as the ideal path 150 for determining the transmission error 240. Therefore, the path 710 may be corrected in a significant effective way. In some embodiments of the present disclosure, the path 710 may be different from the ideal path 150 for determining the transmission error 240. With these embodiments, the procedure for determining the transmission error 240 only needs to be implemented once. After the transmission error 240 is determined, the transmission error 240 may be used to correct one or more to-be-run paths. With the corrected path 720, the tip of the robot system 100 may follow the path 710 in a more accurate way, so as to increase a whole performance of the robot system 100.

It is to be understood that the above paragraphs describe how to determine the transmission error 240 based on only one ideal path 150. In some embodiments, more ideal paths may be used for determining a corresponding transmission error. For example, the above method 300 may be implemented for a second ideal path so as to obtain a second transmission error. Then, paths to be run in the future may be corrected base on both of the transmission error 240 and the second transmission error. With these embodiments, the method for determining the transmission error may be implemented multiple times so as to provide a more accurate transmission error.

Figure 8:
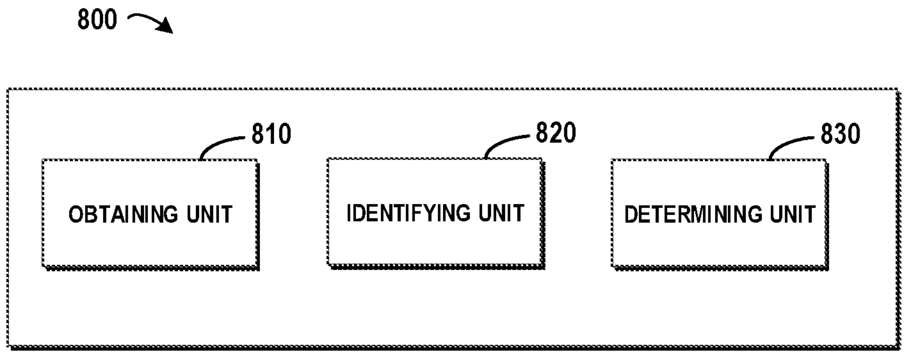
FIG. 8 illustrates a schematic diagram of an apparatus for managing a robot path in accordance with embodiments of the present disclosure.

The preceding paragraphs having described detailed steps of the method 300, in some embodiments of the present disclosure, the method 300 may be implemented by an apparatus 800 for managing a robot path. FIG. 8 illustrates a schematic diagram of an apparatus 800 for managing a robot path in accordance with embodiments of the present disclosure. The robot system comprises at least one arm, and an arm in the at least one arms has a joint for rotating the arm. As illustrated in FIG. 8, the apparatus 800 may comprise: an obtaining unit 810, being configured for obtaining a real path of a tip of the robot system during directing a movement of the tip to follow an ideal path; an identifying unit 820, being configured for identifying a path deviation between the real path and the ideal path; and a determining unit 830, being configured for determining a transmission error of the joint based on the path deviation and kinematic data associated with the movement and a plurality of rotations of the joint respectively at a plurality of time points during the movement.

In some embodiments, the determining unit 830 comprises: a representing unit, being configured for representing the transmission error by a group of sinusoid functions, a sinusoid function in the group of sinusoid functions being associated with the plurality of rotations of the joint; an aligning unit, being configured for aligning the transmission error with the path deviation according to the plurality of time points; and a function determining unit, being configured for determining the group of sinusoid functions at the plurality of time points based on the aligned path deviation and the kinematic data.

In some embodiments, the representing unit comprises: a defining unit, being configured for, with regard to the sinusoid function in the group of sinusoid functions, defining the sinusoid function by an amplitude and a phase shift.

In some embodiments, the function determining comprises: a generating unit, being configured for, with respect to a time point in the plurality of time points, generating a formula based on a value in the path deviation and data in the kinematic data; and a solving unit, being configured for solving the amplitude and the phase shift based on formulas for the plurality of time points.

In some embodiments, the solving unit comprises: a parameter solving unit, being configured for solving the amplitude and the phase shift under a constraint that a sum of the differences being minimized.

In some embodiments, the apparatus 800 further comprises: a kinematic data obtaining unit, being configured for with respect to a time point in the plurality of time points, obtaining the kinematic data based on an offset in the real path caused by a rotation of the joint at the time point.

In some embodiments, the ideal path relates to at least one direction in a coordinate of the robot system, and a frequency related to the plurality of time points is higher than twice of a product of a frequency coefficient of any sinusoid function and an angular speed of the joint.

In some embodiments, the apparatus 800 further comprises: a correcting unit, being configured for correcting, by the transmission error, a path that is to be followed by the tip of the robot system; and a directing unit, being configured for directing a movement of the tip to follow the corrected path.

In some embodiments, the correcting unit comprises: an offset determining unit, being configured for, with respect to a time point in the path, determining a path offset associated with a rotation of the joint at the time point; and an updating unit, being configured for updating, by the path offset, a point in the path at the time point.

In some embodiments, the obtaining unit 810 being further configured for obtaining a further real path of the tip during directing a further movement of the tip to follow a further ideal path; the identifying unit being further configured for identifying a further path deviation between the further real path and the further ideal path; the determining unit being further configured for determining a further transmission error of the joint based on the further path deviation and further kinematic data associated with the further movement; and the correcting unit being further configured for correcting, by the transmission error and the further transmission error, a path that is to be followed by the tip of the robot system.

Figure 9:
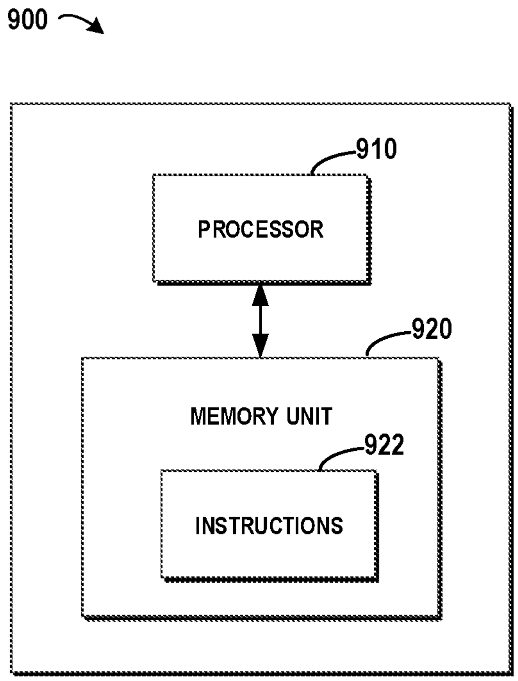
FIG. 9 illustrates a schematic diagram of a system for managing a robot path in accordance with embodiments of the present disclosure.

In some embodiments of the present disclosure, a system 900 for managing a robot path is provided. FIG. 9 illustrates a schematic diagram of the system 900 for managing a robot path in accordance with embodiments of the present disclosure. As illustrated in FIG. 9, the system 900 may comprise a computer processor 910 coupled to a computer-readable memory unit 920, and the memory unit 920 comprises instructions 922. When executed by the computer processor 910, the instructions 922 may implement the method for managing a robot path as described in the preceding paragraphs, and details will be omitted hereinafter.

In some embodiments of the present disclosure, a computer readable medium for managing a robot path is provided. The computer readable medium has instructions stored thereon, and the instructions, when executed on at least one processor, may cause at least one processor to perform the method for managing a robot path as described in the preceding paragraphs, and details will be omitted hereinafter.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to FIG. 3. Generally, program modules include routines, programs, libraries, objects, classes, components, data structures, or the like that perform particular tasks or implement particular abstract data types. The functionality of the program modules may be combined or split between program modules as ideal in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for managing a robot path of a robot system, the robot system comprising at least one arm, and an arm of the at least one arm having a joint for rotating the arm, the method comprising:

obtaining a real path of a tip of the robot system during directing a movement of the tip to follow an ideal path;

wherein the obtaining comprises:

determining, for a time point in a plurality of time points, a Jacobian matrix of the robot system based on a tip position difference between two consecutive time points in an ideal path and an angular difference of the joint between the two consecutive time points in kinematic data, the Jacobian matrix defining a ratio between an offset covered by a rotation of the joint;

wherein the kinematic data defines rotations of the joint;

wherein the kinematic data is at least partially defined based on position information received from a sensor disposed on the tip;

utilizing the Jacobian matrix to obtain the real path of the tip during movement of the tip of the robot system directed to follow the ideal path;

identifying a path deviation between the real path and the ideal path; and determining a transmission error of the joint based on the path deviation and the kinematic data associated with the movement and a plurality of rotations of the joint respectively at a plurality of time points during the movement;

wherein determining the transmission error comprises:

representing the transmission error by a plurality of sinusoid functions, a sinusoid function in the plurality of sinusoid functions being associated with the plurality of rotations of the joint;

aligning the transmission error with the path deviation according to the plurality of time points; and determining the plurality of sinusoid functions at the plurality of time points based on the aligned path deviation and the kinematic data;

correcting, by the transmission error, a path that is to be followed by the tip of the robot system; and directing a movement of the tip to follow the corrected path.

2. The method of claim 1, wherein representing the transmission error comprises: with regard to the sinusoid function in the plurality of sinusoid functions, defining the sinusoid function by an amplitude and a phase shift.

3. The method of claim 2, wherein determining the plurality of sinusoid functions comprises:

with respect to a time point in the plurality of time points, generating a formula based on a value in the path deviation and data in the kinematic data; and solving the amplitude and the phase shift based on formulas for the plurality of time points.

4. The method of claim 3, wherein solving the amplitude and the phase shift comprises:

solving the amplitude and the phase shift under a constraint that a sum of differences between the real path and the ideal path is minimized.

5. The method of claim 1, further comprising: with respect to a time point in the plurality of time points, obtaining the kinematic data based on an offset in the real path caused by a rotation of the joint at the time point.

6. The method of claim 1, wherein the ideal path relates to at least one direction in a coordinate of the robot system, and wherein a frequency related to the plurality of time points is higher than twice of a product of a frequency coefficient of any sinusoid function in the plurality of sinusoid functions being associated with the plurality of rotations of the joint and an angular speed of the joint.

7. The method of claim 1, wherein correcting the path comprises: with respect to a time point in the path, determining a path offset associated with a rotation of the joint at the time point; and updating, by the path offset, a point in the path at the time point.

8. The method of claim 1, further comprising:

obtaining a further real path of the tip during directing a further movement of the tip to follow a further ideal path;

identifying a further path deviation between the further real path and the further ideal path;

determining a further transmission error of the joint based on the further path deviation and further kinematic data associated with the further movement; and correcting, by the transmission error and the further transmission error, a path that is to be followed by the tip of the robot system.

9. A system for managing a robot path, comprising:

a computer processor coupled to a computer-readable memory unit, the memory unit comprising instructions that when executed by the computer processor implements the method according to claim 1.

10. A non-transitory computer readable medium having instructions stored thereon, the instructions, when executed on at least one processor, cause the at least one processor to perform the method according to claim 1.

11. An apparatus comprising a processor for managing a robot path of a robot system, the robot system comprising at least one arm, and an arm of the at least one arm having a joint for rotating the arm, the apparatus comprising:

an obtaining unit, being configured for obtaining a real path of a tip of the robot system during directing a movement of the tip to follow an ideal path;

wherein the obtaining unit is configured to:

determine, for a time point in a plurality of time points, a Jacobian matrix of the robot system based on a tip position difference between two consecutive time points in an ideal path and an angular difference of the joint between the two consecutive time points in kinematic data, the Jacobian matrix defining a ratio between an offset covered by a rotation of the joint; and wherein the kinematic data defines rotations of the joint;

wherein the kinematic data is at least partially defined based on position information received from a sensor disposed on the tip;

utilize the Jacobian matrix to obtain the real path of the tip during movement of the tip of the robot system directed to follow the ideal path; and an identifying unit, being configured for identifying a path deviation between the real path and the ideal path;

a determining unit, being configured for determining a transmission error of the joint based on the path deviation and the kinematic data associated with the movement and a plurality of rotations of the joint respectively at a plurality of time points during the movement;

wherein the determining unit comprises:

a representing unit, being configured for representing the transmission error by a plurality of sinusoid functions, a sinusoid function in the plurality of sinusoid functions being associated with the plurality of rotations of the joint;

an aligning unit, being configured for aligning the transmission error with the path deviation according to the plurality of time points; and a function determining unit, being configured for determining the plurality of sinusoid functions at the plurality of time points based on the aligned path deviation and the kinematic data;

a correcting unit, being configured for correcting, by the transmission error, a path that is to be followed by the tip of the robot system; and a directing unit, being configured for directing a movement of the tip to follow the corrected path.

12. The apparatus of claim 11, wherein the representing unit comprises:

a defining unit, being configured for, with regard to the sinusoid function in the plurality of sinusoid functions, defining the sinusoid function by an amplitude and a phase shift.

13. The apparatus of claim 12, wherein the function determining unit comprises:

a generating unit, being configured for, with respect to a time point in the plurality of time points, generating a formula based on a value in the path deviation and data in the kinematic data; and a solving unit, being configured for solving the amplitude and the phase shift based on formulas for the plurality of time points.

14. The apparatus of claim 13, wherein the solving unit comprises:

a parameter solving unit, being configured for solving the amplitude and the phase shift under a constraint that a sum of differences between the real path and the ideal path is minimized.

15. The apparatus of claim 11, further comprising:

a kinematic data obtaining unit, being configured for with respect to a time point in the plurality of time points, obtaining the kinematic data based on an offset in the real path caused by a rotation of the joint at the time point.

16. The apparatus of claim 11, wherein the ideal path relates to at least one direction in a coordinate of the robot system, and a frequency related to the plurality of time points is higher than twice of a product of a frequency coefficient of any sinusoid function in the plurality of sinusoid functions being associated with the plurality of rotations of the joint and an angular speed of the joint.

17. The apparatus of claim 11, wherein the correcting unit comprises:

an offset determining unit, being configured for, with respect to a time point in the path, determining a path offset associated with a rotation of the joint at the time point;

and an updating unit, being configured for updating, by the path offset, a point in the path at the time point.

18. The apparatus of claim 11, wherein:

the obtaining unit being further configured for obtaining a further real path of the tip during directing a further movement of the tip to follow a further ideal path;

the identifying unit being further configured for identifying a further path deviation between the further real path and the further ideal path;

the determining unit being further configured for determining a further transmission error of the joint based on the further path deviation and further kinematic data associated with the further movement; and the correcting unit being further configured for correcting, by the transmission error and the further transmission error, a path that is to be followed by the tip of the robot system.

* * * * *